United States Patent

Lin

[11] Patent Number: 6,052,789
[45] Date of Patent: Apr. 18, 2000

[54] POWER MANAGEMENT ARCHITECTURE FOR A RECONFIGURABLE WRITE-BACK CACHE

[75] Inventor: James C. Lin, Cupertino, Calif.

[73] Assignee: Packard Bell NEC, Inc., Sacramento, Calif.

[21] Appl. No.: 08/479,245

[22] Filed: Jun. 7, 1995

Related U.S. Application Data

[63] Continuation of application No. 08/205,217, Mar. 2, 1994, abandoned.

[51] Int. Cl.[7] .................................................. H02J 1/10
[52] U.S. Cl. ......................... 713/300; 713/320; 365/229
[58] Field of Search ...................... 365/228, 229; 395/113, 425, 182.12, 182.22, 468, 469, 470; 713/300, 320

[56] References Cited

U.S. PATENT DOCUMENTS

| | | | |
|---|---|---|---|
| 4,564,922 | 1/1986 | Muller | 364/900 |
| 4,959,774 | 9/1990 | Davis | 364/200 |
| 5,007,027 | 4/1991 | Shinoi | 365/229 |
| 5,025,421 | 6/1991 | Cho | 365/228 |
| 5,175,842 | 12/1992 | Totani | 395/425 |
| 5,204,840 | 4/1993 | Mazur | 365/228 |
| 5,204,963 | 4/1993 | Noya et al. | 365/229 |
| 5,307,477 | 4/1994 | Taylor et al. | 395/425 |
| 5,313,612 | 5/1994 | Satoh et al. | 395/425 |
| 5,325,504 | 6/1994 | Tipley et al. | 395/425 |
| 5,325,509 | 6/1994 | Lautzenheiser | 364/200 |

FOREIGN PATENT DOCUMENTS

| | | | |
|---|---|---|---|
| 305445 | 12/1988 | Japan | G06F 12/16 |
| 0136351 | 2/1989 | Japan | G06F 12/08 |
| 105118 | 4/1992 | Japan | G06F 3/06 |
| 365152 | 12/1992 | Japan | G06F 12/08 |
| 0511930 | 1/1993 | Japan | G06F 1/28 |
| 105856 | 1/1993 | Japan | G06F 1/04 |

*Primary Examiner*—Emmanuel L. Moise
*Attorney, Agent, or Firm*—Skjerven, Morrill, MacPherson, Franklin & Friel; Edward C. Kwok

[57] ABSTRACT

A computer system having a power monitoring device places a write-back cache memory into a write-through mode upon detection of a low-battery condition or a user request. Under write-through mode, the cache memory need not be flushed every time a suspend mode of the computer system is entered. Thus significant power is saved during typical portable computer operations.

8 Claims, 1 Drawing Sheet

POWER MANAGEMENT ARCHITECTURE FOR A RECONFIGURABLE WRITE-BACK CACHE

This application is a continuation of application Ser. No. 08/205,217, filed Mar. 2, 1994, now abandoned.

BACKGROUND OF THE INVENTION

1. Field of the Invention

The present invention relates to computer system designs, and in particular, relates to low-power computer system designs.

2. Discussion of the Related Art

A computer system's performance can be significantly enhanced by the use of a cache memory. In fact, in many microprocessor-based computer systems today, to increase performance, two or more levels of caching are common. In a typical one of such computer systems, a primary cache memory is provided on-chip in the microprocessor, and a secondary cache memory is provided at the system level to supplement the primary cache memory. To further enhance performance, these cache memories can be implemented as "write-back" caches. Write-back caches, unlike "write-through" caches, do not immediately write a modified memory word into the main memory. Rather, the "dirty" memory words remain in the cache and are written back into the main memory at the occurrence of a pretermined event, such as a timer interrupt programmed to occur periodically.

Thus, in a write-back cache, an issue of cache coherency may arise; that is, at any given time, one or more cached memory words may be different from the corresponding memory word or words in the main memory. Hence, if the cache memory fails for any reason, data cached in the cache memory may be lost. In a portable computer running on battery power, such an event may occur when the battery runs down after a period of use. In the prior art, to avoid lost of data, when a computer system detects a low-battery condition, the user proceeds at the risk of data loss.

In a typical computer system today, the cache memory is responsible for a significant portion of the computer system's power consumption. Typically, relatively more power is consumed by the cache memory during periods of high activities, i.e. reading and writing operations of the cache memory, than when the cache memory is in a stand-by mode. Thus it can be seen that, in a portable computer system, the battery operational life between recharges is traded for the high performance of the cache memory. However, in many applications, where performance is not considered critical, e.g. in many word processing applications, a longer battery life between recharges may be preferable to the higher performance provided by the cache memory.

SUMMARY OF THE INVENTION

In accordance with the present invention, a battery-powered computer system is provided in which power consumption is minimized and data loss is prevented by configuring a secondary cache as a write-through cache in response to a control signal indicating a level of charge in the battery falling below a predetermined level.

According to the present invention, such a computer system includes, in addition to a central processing unit and a main memory system, (i) a battery for powering the computer system; (ii) a battery monitoring circuit for measuring a level of charge in the battery, in which the battery monitoring circuit provides a first control signal when the charge measured by the battery monitor circuit falls below a predetermined level, (iii) a logic circuit, coupled to receive the first control signal, providing a second control signal; and (iv) a cache memory for the main memory system, the cache memory including a cache controller coupled to receive the second control signal, the cache controller being selectably configurable to operate the cache memory as a write-back or a write-through cache, in response to the second control signal.

In one embodiment of the present invention, the central processing unit is supported by both a primary cache, and a secondary cache. The present invention also provides that the cache controller, in response to the second control signal, writes out any modified cache lines in the cache memory into the main memory, prior to operating the cache memories as write-through caches. In one embodiment, the computer system receives the first control signal into a keyboard controller.

In accordance to the present invention, a method is also provided to minimize power consumption in a computer system, the computer system having a central processing unit and a main memory system, the method including the steps of: (i) powering the computer system using a battery; (ii) monitoring a level of charge in the battery using a battery monitoring circuit and providing a first control signal when the battery monitoring circuit detects that the level of charge falls below a predetermined level; (iii) providing a second control signal, in response to said first control signal, using a logic circuit; and (iv) providing a cache memory for the main memory system, the cache memory including a cache controller coupled to receive the second control signal, and configuring the cache controller to operate said cache memory as a write-back or a write-through cache, in response to the second control signal.

The present invention is better understood upon consideration of the detailed description below and the accompanying drawings.

DETAILED DESCRIPTION OF THE PREFERRED EMBODIMENTS

Figure 1:
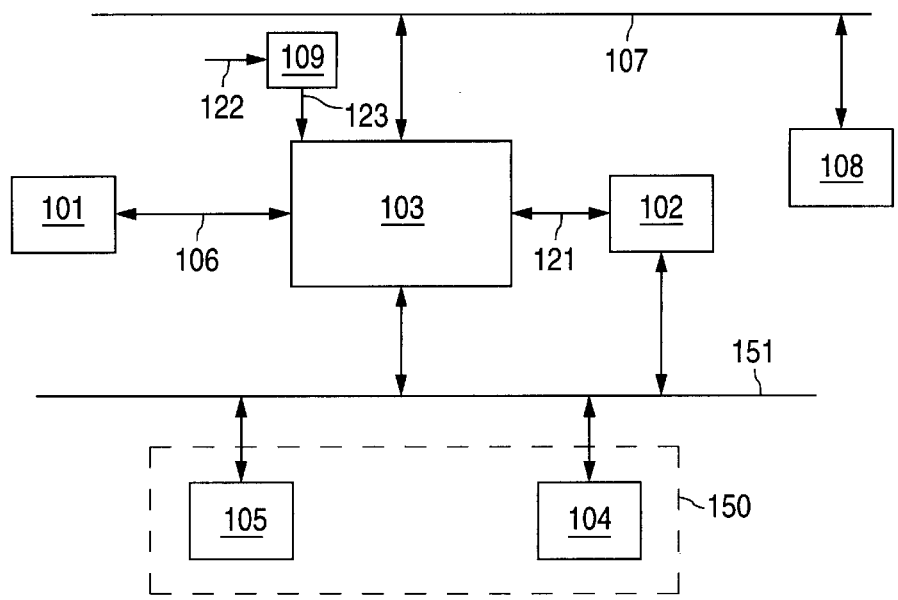
FIG. 1 is a block diagram of a computer system 100 having a reconfigurable write-back cache memory 102 in one embodiment of the present invention.

The present invention provides a computer system in which, in response to a low-battery condition or a user request, a write-back cache is selectably disabled or placed in "write-through" mode. FIG. 1 is a block diagram of a computer system 100 having a reconfigurable write-back cache memory 102, in accordance with the present invention.

As shown in FIG. 1, computer system 100 includes a CPU 101, which accesses over a memory bus 151 both a main memory system 150 and a cache memory 102. CPU 101 can be one of a number of high performance microprocessors, such as the Pentium, or the 80486 microprocessor; either processor is available from Intel Corporation, Santa Clara, Calif. Typically in such a high performance microprocessor, an on-chip cache is provided. Thus, with such a microprocessor in computer system 100, cache memory 102 serves as a secondary cache memory to support the operation of the primary cache memory within microprocessor 101. In addition, CPU 101 is supported by a control logic ("core logic") chip 103, which typically includes (i) a memory controller for controlling a main memory system 150, shown in FIG. 1 as including dynamic random access memory (DRAM) 104 and a non-volatile memory 105 which is used to hold the firmware and the configuration information of computer system 100; (ii) a CPU bus controller, for controlling the transactions on a CPU bus 106; (iii) a peripheral controller for controlling the transactions on input/output bus 107 and (iv) a cache controller for controlling a scondary cache memory, such as cache memory 102. In FIG. 1, CPU bus 106 includes control, address and data signals. Also shown in FIG. 1 is a peripheral device 108, which can be any peripheral device, such as a hard disk controller. In this embodiment, the cache controller in core logic 103 is capable of providing either write-through or write-back control for cache memory 102, in accordance with a configuration bit set in core logic 103. Such a cache controller is known in the art. The firmware of computer system 101 includes the basic input/output system (BIOS). Non-volativle memory 105 is typically one or more electrically programmable read-only memory (EPROM) integrated circuits. Core logic 103 can be implemented by a core logic integrated circuit available from Pico Power Inc., Redwood City, Calif. Specific information about this core logic circuit can be obtained from Pico Power Inc. Cache 102 caches the memory space occupied by DRAM 104.

In computer sysetem 100, a keyboard controller 109 (not shown in FIG. 1) is provided to receive a number of control signals. Such a keyboard controller device can be implemented by the M38802 integrated circuit, from Mitsubishi Corporation. Keyboard controller 108 monitors signals 122 from one or more input devices, e.g. a keyboard or a mouse, and other devices, such as a modem. For example, when external data arrives at a modem connection, a control signal RI# ("ring input") is activated by the modem to alert keyboard controller 109, which in turns signals core logic 103. In computer system 100 and, when a period of no activity is detected, core logic 103 places computer system 100 into a "suspend" mode. The suspend mode can also be entered in response to a user request generated by the user pressing an assigned key on the keyboard. Normally, in the suspend mode, only DRAM 104, any video memory (when available), and keyboard controller 108 are enabled. To preserve data coherency, prior to entering the suspend mode, the primary cache within microprocessor 101 and secondary cache 102 are "flushed", i.e. synchronized with DRAM 104. When one of the control signals 122 becomes active, e.g. when a key in the keyboard is pressed, keyboard controller 109 provides a control signal (i.e. one of signals 123) to "wake up" computer system 100 to resume activity. In this manner, power consumption in computer system 100 is reduced for the inactive period, resulting in a period of longer battery operation between recharges.

In accordance with the present invention, a "battery gauge" 204 (shown in FIG. 2), is provided to measure the remaining charge in the battery of computer system 100. One suitable battery gauge can be obtained from Benchmarq, Austin, Tex. A more preferred battery gauge is one which keeps in a counter account of the difference between th total charge supplied to and the total charge drained from a battery. The total charge supplied to a battery can be obtained by integrating over time the charging current. Likewise, the total charge drained from the battery can be obtained by integrating over time the discharging current. The charging and discharging currents can be measured by the voltage across a known resistance. When the battery gauge reaches a predetermined condition, e.g. 25% charge remaining, battery gauge 204 activates a control signal, which is provided as an input signal to keyboard controller 109.

Figure 2:
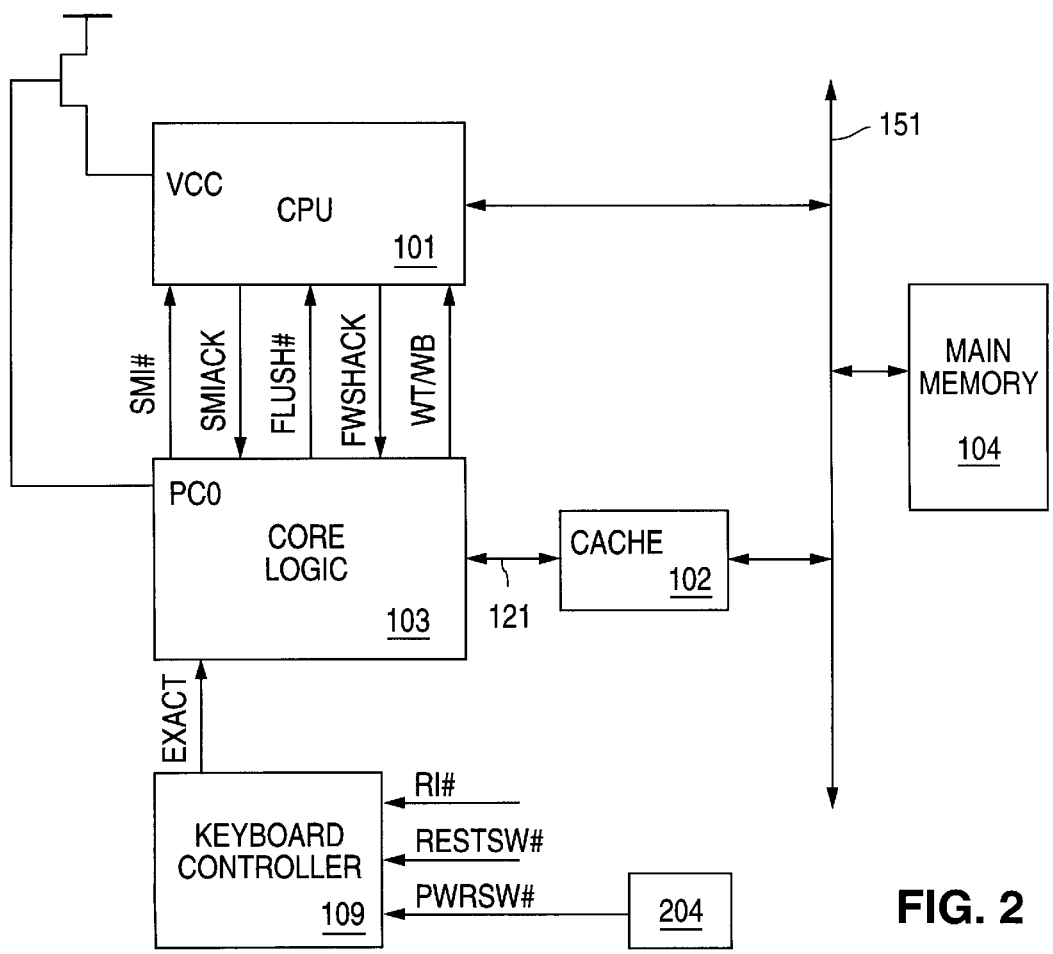
FIG. 2 shows in further detail the control signals of computer system 100 used in providing the present invention.

FIG. 2 shows in further detail the relevant control signals of computer system 100 used to implement the present invention. As shown in FIG. 2, when battery gauge 204 detects the predetermined battery condition, a control signal PWRSW# is activated at keyboard controller 109, which in turns generate a control signal EXACT2 at keyboard controller 109. When the active EXACT2 signal is received by core logic 103, a "system management interrupt" (SMI) is generated at CPU 101 asserting a control signal SM#. CPU 101 responds by asserting an acknowledge signal SMIACK, and branches to a service routine. In one embodiment, the default address for this service routine is 30000 (hexadecimal). The service routine examines the state of computer system 100 to determine that the SMI interrupt is originated from the active control signal PWRSW#. Thereupon, the service routine writes a control word into a control register of core logic 103, which actives a control signal FLUSH# to flush the on-chip primary cache of CPU 101 into secondary cache memory 102. When the flushing of the primary cache in CPU 101 is complete, CPU 101 asserts a control signal FLUSHACK. In response to control signal FLUSHACK, core logic 103 asserts signal WT/WB to cause the primary cache in CPU 101 to operate under write through mode. At the same time, the cache controller in core logic 103 begins the flushing of secondary cache 102 into DRAM 104.

When the flushing of secondary cache 102 into DRAM 104 is complete, i.e. all the "dirty" lines of cache 102 are written into DRAM 104, core logic 103 configures its cache controller to operate cache 102 as a write-through cache, by writing a control word into a control register of the cache controller. Alternatively, cache 102 can also be disabled altogether. Under the write-through mode, DRAM 104 and cache 102 are always synchronized, so that, if it becomes necessary for computer system 100 to enter the suspend mode, secondary cache 102 can simply be shut down without first performance a power consuming flush operation into DRAM 104. Significant power can therefore be saved, if computer system 100 goes into suspend mode frequently, as is typical of portable computer operations. Alternatively, the user can also request that cache 102 be placed in the write-through mode, or be disabled, through a user request entered from the keyboard. Such a request results in the same sequence of events described above with respect to the keyboard controller's system management interrupt.

The above detailed description is provided to illustrate the specific embodiments of the present invention, and is not intended to be limiting. Numerous variations and modifications are possible within the scope of the present invention. The present invention is defined by the following claims.

What is claimed is:

1. A computer system, including a central processing unit and a main memory system, said computer system comprising:

a battery for powering said computer system;

a battery monitoring circuit for measuring a level of charge in said battery, said battery monitoring circuit providing a first control signal when said charge measured falls below a predetermined level;

a logic circuit, coupled to receive said first control signal, for providing a second control signal; and a cache memory for said main memory system, said cache memory including a cache controller coupled to receive said second control signal, said cache controller initially operating said cache memory as a "write-back cache", said cache controller providing, in response to said second control signal, an interrupt signal to said central processing unit, thereby causing said central processing unit to execute a service routine in response to said interrupt signal, said service routine causing said central processing unit to provide a third control signal to said cache controller, whereupon said cache controller either disables said cache memory or operates said cache memory as a write-through cache, in response to said third control signal.

2. A computer system as in claim 1, wherein said central processing unit has a primary cache and wherein said cache memory serves as a secondary cache.

3. A computer system as in claim 1, wherein said cache controller, in response to said second control signal, writes out any modified cache lines in said cache memory to said main memory, prior to operating said cache memory as a write-through cache.

4. A computer system as in claim 1, wherein said logic circuit includes a keyboard controller.

5. A method for minimizing power consumption and data loss in a computer system, said computer system having a central processing unit and a main memory system, said method comprising the steps of:

powering said computer system using a battery;

monitoring a level of charge in said battery using a battery monitoring circuit and providing a first control signal to a logic circuit when said battery monitoring circuit detects said level of charge falling below a predetermined level;

providing a second control signal generated by said logic circuit in response to said first control signal;

providing a cache memory for said main memory system, said cache memory including a cache controller coupled to receive said second control signal, said cache controller operating said cache memory initially as a "write-back" cache; and providing an interrupt signal to said central processing unit, generated by said cache controller in response to said second control signal, so as to cause said central processing unit to execute a service routine in response to said interrupt signal, said service routine causing said central Processing unit to provide a third control signal to said controller, whereupon said cache controller either disables said cache memory or operates said cache memory as a write-through cache, in response to said third control signal.

6. A method as in claim 5, wherein said method provides in said central processing unit a primary cache and wherein said method provides said cache memory as a secondary cache.

7. A method as in claim 5, wherein said method, upon providing said second control signal, writes out any modified cache lines in said cache memory to said main memory, prior to operating said cache memory as a write-through cache.

8. A method in claim 5, wherein said method issues said second control signal from a keyboard controller.

* * * * *